UNITED STATES PATENT OFFICE.

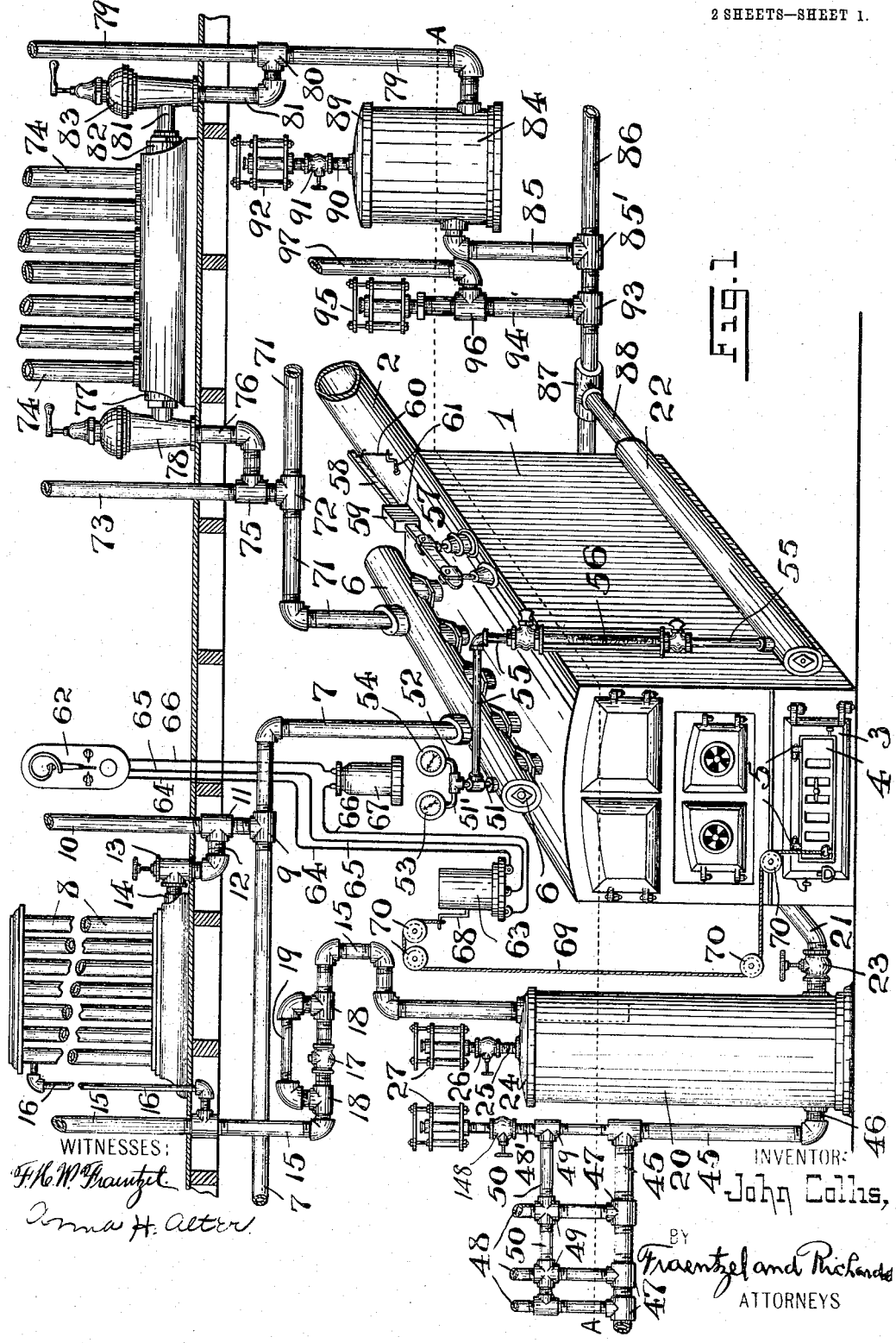

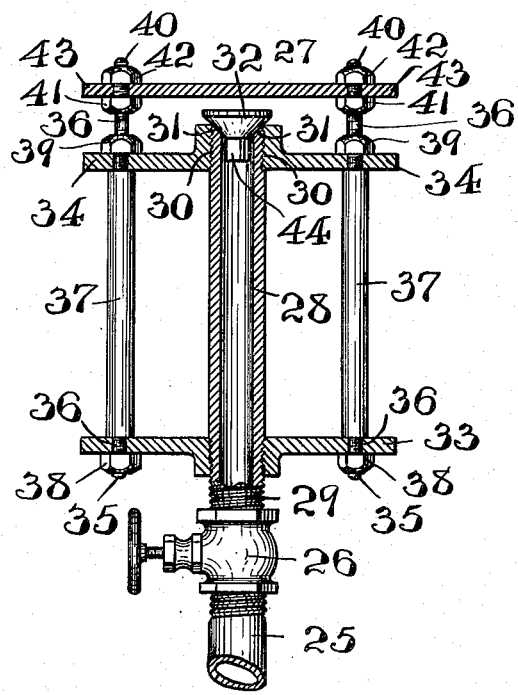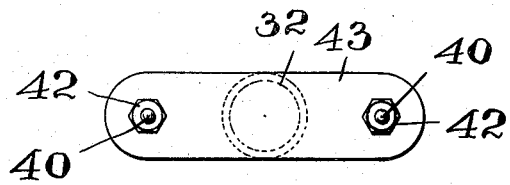

JOHN COLLIS, OF NEWARK, NEW JERSEY.

HEATING SYSTEM.

No. 931,037.　　　　Specification of Letters Patent.　　　　Patented Aug. 17, 1909.

Application filed July 9, 1908. Serial No. 442,633.

*To all whom it may concern:*

Be it known that I, JOHN COLLIS, a citizen of the United States, residing at Newark, in the county of Essex and State of New Jersey, have invented certain new and useful Improvements in Heating Systems; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in systems for heating buildings; and, the present invention relates, more particularly, to a novel steam-heating system in which the air is first expelled from the apparatus with pressure, while generating a pressure in the heat-generator, then automatically closing the damper in the smoke-flue, at a predetermined pressure, and at the same time closing off altogether the draft by means of a thermostat, or other suitable device which is regulated by the temperature required, and the heating system thereupon being adapted to heat the building by means of the vapor generated by boiling the water in the generator under vacuum.

This invention, therefore, has for its principal object to provide a novel steam-heating system of the general character hereinafter more fully set forth comprising a circulating system of pipes, and radiators located at different points in said pipes, through which the heating medium is to be conducted from a heat-generator located in said system of piping, the said heat-generator having its damper in the smoke-flue normally wide open, but closing automatically as soon as a predetermined pressure is produced in the heat-generator, said pressure expelling any air, that may be contained in the system of piping and radiators, from suitable exhaust-valves which may be variously located in the system of piping for producing a vacuum; and the invention having for its further purposes to automatically close or shut off at a predetermined or desired degree of temperature, the draft to the furnace or heat-generator, while the building is being heated by the vapor generated by boiling the water under vacuum.

My invention has for its further purposes to provide in connection with the heating system to be hereinafter more fully described, an automatically operating air exhaust or exhausts located within the system of piping at any suitable point or points.

Other objects of this invention not at this time more particularly enumerated will be clearly evident from the following detailed description of my present invention.

With the various objects of my present invention in view, the said invention consists, primarily, in the novel heating system hereinafter set forth; and, the invention consists, furthermore, in the novel arrangements and combinations of devices and instrumentalities embodying the principal features of the present invention, as well as in the details of the construction of the various parts of the same, all of which will be more fully described in the following specification, and then finally embodied in the clauses of the claims which are appended to and which form an essential part of this specification.

The invention is clearly illustrated in the accompanying drawings, in which:

Figure 1 is a diagrammatical representation of a heating system or apparatus showing one embodiment of the principles of the present invention. Fig. 2 is a vertical sectional representation of one of the automatic air-exhausts used with the heating system; and Fig. 3 is a top view of the same.

Similar characters of reference are employed in all of the above described views, to indicate corresponding parts.

Referring now to the said drawings, the reference-character 1 indicates any suitable form of heat-generator or furnace, 2 is the smoke-flue of the same, and 3 the ash-pit door, said latter door being provided with the usual movable draft-controlling member or element 4 which is hinged over the usual opening in the door 3 by means of hinges 5, substantially as shown in Fig. 1 of the drawings. In the present case, the heat-generator is provided with a manifold, as 6, of any usual construction, from which extends a main pipe 7, leading to the various heaters or radiators located at different points in a building.

In Fig. 1 of the drawings, I have shown for the purposes of my present invention, a radiator, as 8, and 9 indicates a suitable T-fitting located in the main pipe 7. Connected with and extending from said fitting 9 is a riser 10, in which is a T-fitting 11 from which extends a pipe 12 having a valve 13 located therein, and said pipe 12 being attached to the radiator 8, as at 14. The reference-character 15 indicates a suitable return pipe, between which, and the upper portion of the radiator 8, is intermediately disposed an air-return pipe 16. The said return-pipe 15 has located therein a suitable check-valve 17, to keep the water from backing up when the radiator is shut off, and on opposite ends of said check-valve are suitable T-fittings 18, which are suitably connected by a pipe 19 of smaller diameter which forms a by-pass around the said check-valve, substantially as shown, and for the purposes to be hereinafter more fully set forth. The said return-pipe 15 extends into and terminates in a suitable tank or reservoir 20, with which it is connected to receive any water of condensation and air coming from said pipe 16. At the bottom of the tank is a pipe 21, which in turn is connected with one of the return-manifolds, as 22, at the sides and lower portions of the heat-generator or furnace with which the manifolds are suitably connected in any well-known and usual manner. The pipe may be provided with a closing valve 23, substantially as shown. Extending from the top-cover or head 24 of said tank or reservoir 20 is a pipe 25 which may be provided with a shut-off valve 26 and to which is attached a suitably constructed air-exhaust 27.

Any suitably constructed device for exhausting the air from the tank or reservoir may be used, that herein shown being automatic in its operation. This automatic air-exhaust is more clearly shown in Fig. 2 of the drawings, and the same consists of a main tube 28 having a lower screw-threaded end-portion 29 which is screwed into one of the usual and internally screw-threaded portions of the valve 26. The upper end-portion of the said tube 28 is also screw-threaded, as at 30, and said end-portion of the tube 28 is made with a valve-seat 31 upon which is loosely disposed a suitably constructed valve or valve-disk 32. Suitably screwed upon the screw-threaded portion 29 is a plate 33, and screwed upon the screw-threaded portion 30 is another plate 34, the said plates 33 and 34 being tied by means of the tie-bolts 35 which are slipped through suitable sleeves 37, substantially as shown, and are secured by means of nuts 38 and 39 arranged upon suitably disposed screw-threaded portions 36 of said tie-bolts. Upon the upper screw-threaded end-portions 40 of said bolts are other nuts 41 and 42, which suitably secure another plate 43 in position, in the manner shown. This plate 43 is located at such a distance above the valve 32, so that the valve will be capable of a limited movement from its valve-seat without entirely withdrawing the stem 44 of the valve-disk from within the tube 28, as will be clearly evident. If desired, leading from any one or more of the suitably disposed radiators, there may be a return-pipe 45 which is connected at its end 46 with the tank or reservoir 20 in the manner shown in said Fig. 1 of the drawings, the said return-pipe 45 having located therein a multiplicity of T-fittings 47, with which are connected the air-return pipes 48. The said pipes 48 are all of them preferably connected with each other by means of suitable fittings 49 and the pipe 50, and connected with the upper end-portion of a pipe 48' is a closing-valve 148 and an air-exhaust 27, which are generally arranged and constructed in the manner of the valve and exhaust 27 described in connection with the tank or reservoir 20, the purpose being to exhaust any air through the exhaust-device 27, and any water of condensation coming through the pipes 48 flowing down into the main return-pipe 45, as will be clearly evident. Extending from the manifold 6 is a small pipe 51, carrying the branches 51' and 52, one of which, as 51', is provided with a steam-gage 53, and the other branch 52 being provided with a vacuum gage 54. Extending from the pipe 51 and connected with one of the return-manifolds 22 is a pipe 55 in which is arranged any suitable construction of water-gage 56. The reference-character 57 indicates any suitable construction of damper-regulator which is operated from the steam-pressure generated in the heat-generator or boiler, the said damper-regulator comprising the usual pivoted lever 58, upon which is slidably arranged a weight 59. The free end of the said lever 58 has attached thereto, at or near its free end-portion, a flexible connection 60 which in turn is fastened at its other end to a suitable crank-arm 61 of the usual damper arranged in the smoke-pipe or flue 2.

The means for lowering and raising the previously mentioned draft-producing member or element 4 which is connected with the door 3 is as follows:—It consists, generally, of any suitable form of thermostat or mechanical thermometer 62, and a suitably constructed motor 63 of ample power for the task imposed upon it. The mechanism of the motor is in circuit with the thermostat by means of the electric wires 64, 65 and 66, in one of which is an electric battery 67. The construction of the thermostat is such that with the varying temperatures the mechanism of the motor is operated in such a manner, so that a crank-arm 68 can be brought into different positions, whereby a flexible connection 69, which passes over suitably disposed rollers or wheels 70, and is attached at one end to said crank-arm 68 and at its other end to the hinged member or element 4 of the door 3, will raise or lower the said member or element 4, as will be clearly evident, and for the purposes hereinafter more fully specified. Connected with and extending from the manifold 6 is another main pipe 71 in which there is an arrangement of T-fittings 72 for connection to said main pipe 71 of any suitable number of risers 73 which convey the heating medium to variously located heaters or radiators, as 74. In this instance, each riser 73 is provided with a T-fitting 75, a pipe 76 being arranged between each fitting 75 and the inlet-portion 77 of the radiator 74, and a suitable valve 78 being located in said pipe 76. The reference-character 79 indicates a return-riser provided with a T-fitting 80, and 81 is a pipe located between the outlet-portion 82 of the radiator and said fitting 80, said pipe 81 being provided with a closing valve 83. The said return-riser 79 is connected with the lower portion of a suitable tank or reservoir 84, adapted to receive the water of condensation, a pipe 85 leading from the lower portion of said tank or reservoir 84 and being connected by means of a T-fitting 85' with a main return-pipe 86 which is connected by means of a fitting, as 87, and a pipe 88 extending therefrom, with one of the return-manifolds 22, substantially as shown. Extending from the upper portion or head 89 of said tank or reservoir 84 is a pipe 90 which may be provided with a shut-off valve 91, and an air-exhaust, as 92, of the same construction and similar operation as the previously described air-exhaust 27. In place of the tank or reservoir 84, the main return-pipe 86 may have connected therewith, by means of a T-fitting 93, a pipe 94 which extends above the water-line, and is provided upon its upper end-portion with an automatically operating air-exhaust 95, similar in construction and in operation to the air-exhausts 92 and 27. Connected with said pipe 94, by means of a T-fitting 96, at a point below the water-line, is another return-riser or pipe 97 coming from any one of the radiators located in the system of piping.

Having thus in a general way described one general arrangement of the several devices and instrumentalities, as well as the system of piping, embodying the features of my present invention, I will now briefly set forth the operation of the heating system. Having filled the heat-generator or boiler 1 with water to the height indicated by the dotted line A—A in Fig. 1, and having started a fire upon the grate, the damper in the smoke-flue being set in its open relation, and the normal action of the thermostat 62 and the motor 63 being such that the member or element 4 will be raised, so as to provide a good draft, steam is generated to any previously determined pressure, say one pound. While the steam is being generated, it passes through the system of piping into the various radiators, the valves of the radiators, of course, having been previously opened. The result will be that any air contained in the radiators will be driven out therefrom, and finally forced out of the pipes from the automatically operating air-exhausts, previously described, any water of condensation returning to the heater, as will be clearly evident. The damper-regulator having been set so that it will become operative, when a pressure say of one pound is produced, will by means of its lever-arm and the flexible connection entirely close the damper in the smoke-flue except of course the usual orifice in the damper for permitting the escape of any generated gases. When the temperature in the various rooms of the building has risen, say to seventy degrees, or any other previously determined temperature, the action of the thermostat is such, that the motor 63 is permitted to operate the crank-arm connected therewith in such a manner, so that the element or member 4 is entirely closed, and the draft to the furnace is shut off. The air having been forced and fully withdrawn from the radiators and exhausted into the atmosphere, the water in the boiler is boiled under a vacuum, thus continuing to heat the house with the generated heat-vapor, and requiring less consumption of fuel and less radiator-surface. As soon as the pressure falls below one pound, the damper-regulator again becomes operative to set the damper in its opened relation within the smoke-flue. Likewise, if the temperature falls below seventy degrees, the action of the thermostat is such, that the motor 63 is reversely operated, so that the hinged member or element 4 is again raised and a good draft admitted beneath the fire, to produce steam under vacuum.

From the foregoing description of my present invention, it will be evident, that I have devised a simply constructed and efficiently operating steam-heating system or apparatus in which all air is first exhausted from the system, and preferably by means of an automatically operating air-exhaust or exhausts, the water in the heater or boiler thereupon being heated under a vacuum, the heat-vapor being conducted to the radiators for heating the various rooms of a building.

I claim:—

1. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, draft-controlling means connected with the air-inlet to said generator, a damper for controlling the outlet flue, an automatic regulator for operating said damper according to the pressure within the generator, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

2. In a steam heating apparatus, a generator having an air-inlet and an outlet-flue, a radiator, a system of piping connecting said generator and radiator, automatically operating means in said system for permitting the passage of air therefrom when the pressure in the generator rises above a predetermined point, said means preventing the return of air to said system, draft-controlling means connected with the air-inlet to said generator, a damper for controlling the outlet-flue, an automatic regulator for operating said damper according to the pressure within the generator, a thermostat, a motor controlled by said thermostat, and means between said motor and said draft-controlling means arranged to automatically close said draft controlling means when the temperature rises to a predetermined degree, and all further adapted to boil the water in the generator under a vacuum, substantially as and for the purposes set forth.

3. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, draft-controlling means connected with the air-inlet to said generator, a damper for controlling the outlet-flue, an automatic regulator for operating said damper according to the pressure within the generator, means in said system of piping for collecting any air and water of condensation, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

4. In a steam heating apparatus, a generator having an air-inlet and an outlet-flue, a radiator, a system of piping connecting said generator and radiator, automatically operating means in said system for permitting the passage of air therefrom when the pressure in the generator rises above a predetermined point, said means preventing the return of air to said system, draft-controlling means connected with the air-inlet to said generator, a damper for controlling the outlet-flue, an automatic regulator for operating said damper according to the pressure within the generator, means in said system of piping for collecting any air and water of condensation, a thermostat, a motor controlled by said thermostat, and means between said motor and draft-controlling means arranged to automatically close said draft-controlling means when the temperature rises to a predetermined degree, and all further adapted to boil the water in the generator under a vacuum, substantially as and for the purposes set forth.

5. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, draft-controlling means connected with the air-inlet to said generator, a damper for controlling the outlet-flue, an automatic regulator for operating said damper according to the pressure within the generator, a receiving tank in said system of piping for collecting any air and water of condensation, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

6. In a steam-heating apparatus, a generator having an air-inlet and an outlet-flue, a radiator, a system of piping connecting said generator and radiator, automatically operating means in said system for permitting the passage of air therefrom when the pressure in the generator rises above a predetermined point, said means preventing the return of air to said system, draft-controlling means connected with the air-inlet to said generator, a damper for controlling the outlet-flue, an automatic regulator for operating said damper according to the pressure within the generator, a receiving tank in said system of piping for collecting any air and water of condensation, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

7. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, consisting of a tubular member provided with a valve-seat, a valve-disk resting upon said seat, and means for limiting the movement of said valve-disk, all combined with draft-controlling means connected with the air-inlet to said generator, a damper for controlling the outlet-flue, an automatic regulator for operating said damper according to the pressure within the generator, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

8. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, consisting of a tubular member provided with a valve-seat, a valve-disk resting upon said seat, and means for limiting the movement of said valve-disk, all combined with draft-controlling means connected with the air-inlet to said generator, a damper for controlling the outlet-flue, an automatic regulator for operating said damper according to the pressure within the generator, means in said system of piping for collecting any air and water of condensation, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

9. In a steam heating apparatus, a generator having an air-inlet and an outlet-flue, a radiator, a system of piping connecting said generator and radiator, means in said system for permitting the passage of air therefrom when the pressure in the generator rises above a predetermined point, said means preventing the return of air to said system, consisting of a tubular member provided with a valve-seat, a valve-disk resting upon said seat, and means for limiting the movement of said valve-disk, all combined with draft-controlling means connected with the air-inlet to said generator, a damper for controlling the outlet-flue, an automatic regulator for operating said damper according to the pressure within the generator, a receiving tank in said system of piping for collecting any air and water of condensation, a thermostat, a motor controlled by said thermostat, and means between said motor and said draft-controlling means arranged to automatically close said draft-controlling means when the temperature rises to a predetermined degree, and all further adapted to boil the water in the generator under a vacuum, substantially as and for the purposes set forth.

In testimony, that I claim the invention set forth above I have hereunto set my hand this 3rd day of July, 1908.

JOHN COLLIS.

Witnesses:
FREDK. C. FRAENTZEL,
ANNA H. ALTER.